United States Patent [19]
Rutz

[11] Patent Number: 5,669,650
[45] Date of Patent: Sep. 23, 1997

[54] DETACHABLE AND ADJUSTABLE AUXILIARY HANDLE FOR A LONG-HANDLED MATERIAL-MOVING TOOL

[76] Inventor: Almer J. Rutz, Box 543, Riverdale, N. Dak. 58565

[21] Appl. No.: 685,636

[22] Filed: Jul. 24, 1996

[51] Int. Cl.⁶ .............................. A01B 1/22; B25G 3/20
[52] U.S. Cl. ............................................ 294/58; 16/114 R
[58] Field of Search ........................ 294/54.5, 57, 58, 294/59; 15/144.1, 145; 16/111 R, 114 R, 124

[56] References Cited

U.S. PATENT DOCUMENTS

| | | | |
|---|---|---|---|
| 304,067 | 8/1884 | Boyles | 294/58 |
| 1,524,168 | 1/1925 | Burns | 294/58 |
| 4,128,266 | 12/1978 | Vaslas | 294/58 |
| 4,155,582 | 5/1979 | Reisner | 294/58 |
| 4,690,447 | 9/1987 | Adams | 294/58 X |
| 5,331,720 | 7/1994 | Beckingham | 294/58 X |
| 5,400,471 | 3/1995 | Lichfield et al. | 294/58 X |

FOREIGN PATENT DOCUMENTS

| 584189 | 1/1947 | United Kingdom | 294/58 |
|---|---|---|---|
| 9117647 | 11/1991 | WIPO | 294/58 |

Primary Examiner—Johnny D. Cherry
Attorney, Agent, or Firm—David A. Lingbeck

[57] ABSTRACT

A detachable and adjustable auxiliary handle for a long-handled material-moving tool includes a handle bracket having a first leg portion with an end attached to a first foot portion which is curved to fitting mount upon the handle shaft of a shovel, and further having a second leg portion which is integral to the first leg portion and extends at an acute angle relative to the first leg portion and has an end which is attached to a second foot portion which is curved to fitting mount upon the handle shaft of a shovel, and further has three holes aligned and spaced long the length thereof. A generally U-shaped hand-hold support member is adjustably fastened to the second leg portion upon any of the three holes and supports a hand-hold member which is fastened between the two extension portions of the hand-hold support member. The auxiliary handle is fastenable anywhere along the length of the handle shaft of the shovel but preferably near the scoop to essentially eliminate the user having to stoop and incurring back problems as a result.

3 Claims, 2 Drawing Sheets

DETACHABLE AND ADJUSTABLE AUXILIARY HANDLE FOR A LONG-HANDLED MATERIAL-MOVING TOOL

BACKGROUND OF THE INVENTION

The present invention relates to a detachable and adjustable auxiliary handle for a long-handled, material-moving tool such as a shovel which substantially reduces the amount of stooping the user typically does when using a shovel or similar long-handled, material-moving tool, thus substantially reducing any back strain or injury which often accompanies the use of such a conventional tool.

The prior art describes long-handled, material-moving tools such as shovels which typically have a long handle shaft with a handle portion at the rear end of the handle shaft and with a scoop or fork at the front end of the handle shaft. The user has become accustomed to grasping with one hand the long handle shaft near the scoop or fork and grasping with the other hand the handle portion of the handle shaft and moving or lifting the tool. In most instances, the user has to stoop quite a bit to reach and grasp the portion of the handle shaft near the front end thereof in order to generate the leverage necessary to lift the scoop or fork especially if material of some kind is being lifted by the scoop or fork. This stooping and lifting generally causes back strain and often back injuries such as herniated or bulging discs in the back and pulled muscles. Instead of reaching and grasping the handle shaft near the front end thereof, the user would be better off grasping a handle which is raised vertically by at least four inches relative to the portion of the handle shaft where the user generally needs to grasp in order to create the leverage necessary to lift the scoop or fork. The higher the handle relative to the ground, the less the user will have stoop to grasp the handle and the less back problems the user will have as a result. The prior art does not describe nor suggest an auxiliary handle which can be quickly and easily attached and detached and adjusted upon the handle shaft of a long-handled, material-moving tool and which can be taken off one tool and attached to another tool.

SUMMARY OF THE INVENTION

This invention relates to a detachable and adjustable auxiliary handle for a long-handled material-moving tool which comprises a handle bracket having a first leg portion with a curved first foot portion at the end thereof and further having a second leg portion which is angled relative to the first leg portion with a second foot portion at the end of the second leg portion, both leg portions being fastenable with conventional adjustable fastening rings to the handle shaft of the material-moving tool near the front end thereof. A generally U-shaped hand-hold support member is fastened with a fastening member to the second leg portion with a hand-hold member fastened with fastening members to the ends of the hand-hold support member.

One objective of the present invention is to provide a detachable and adjustable auxiliary handle for a long-handled material-moving tool which eliminates the user from having to stoop much when using a tool to either shovel snow, grain, etc., because the auxiliary handle for a long-handled material-moving tool is vertically extended and higher from where the user normally grasps the handle shaft.

Another objective of the present invention is to provide a detachable and adjustable auxiliary handle for a long-handled material-moving tool which substantially prevents back strain or injury to the user, problems usually associated with the user having to stoop while using the tool.

Also, another objective of the present invention is to provide a detachable and adjustable auxiliary handle for a long-handled material-moving tool which can be conveniently and easily adjusted along the handle shaft of the tool to accommodate the reach of any user.

Yet, another objective of the present invention is to provide a detachable and adjustable auxiliary handle for a long-handled material-moving tool where the hand-hold member can be easily and conveniently adjusted along the length of the second leg portion of the handle bracket to accommodate the needs of any user.

Further objectives and advantages of the present invention will become apparent as the description proceeds and when taken in conjunction with the accompanying drawings wherein:

DETAILED DESCRIPTION OF THE INVENTION

Figure 1:
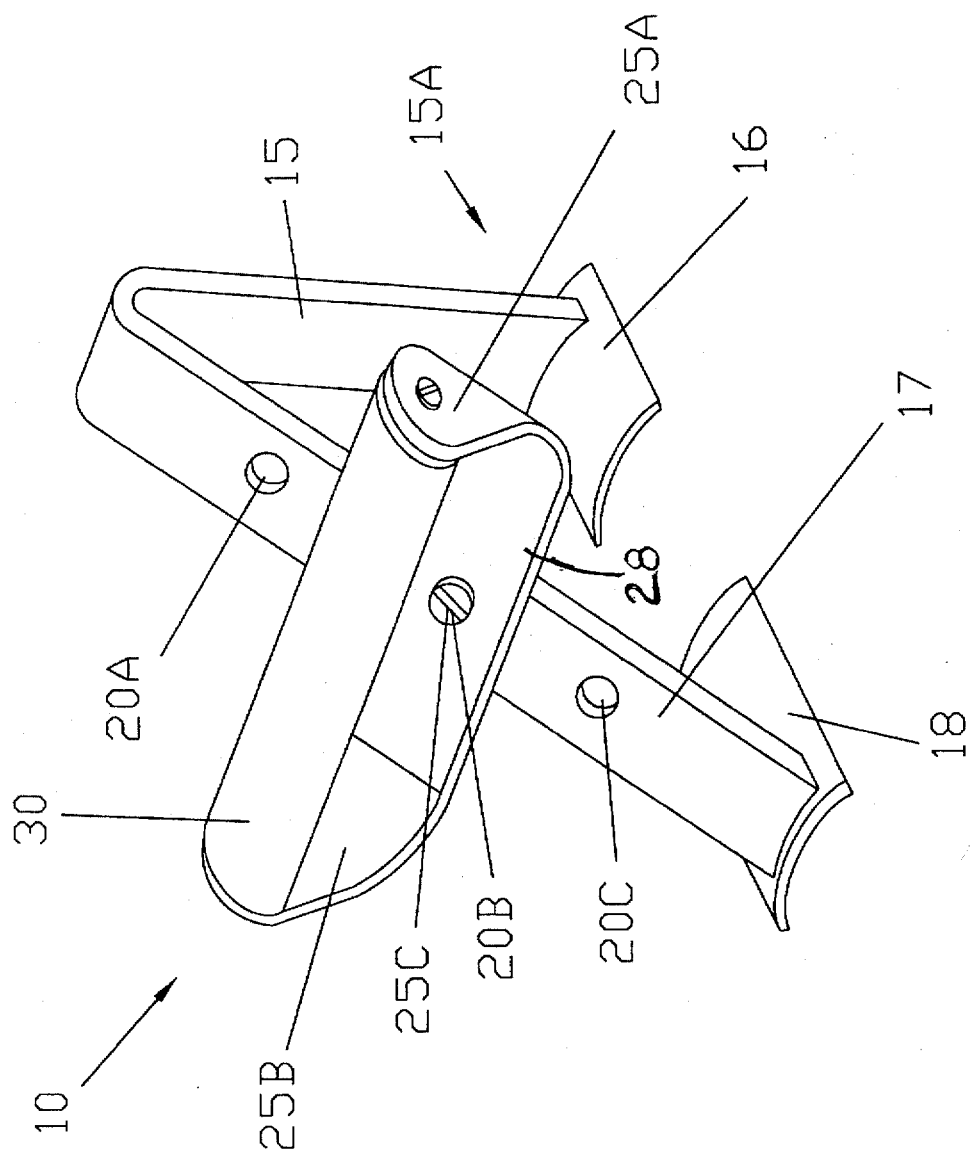
FIG. 1 is a perspective view of the detachable and adjustable auxiliary handle for a long-handled material-moving tool.
Figure 2:
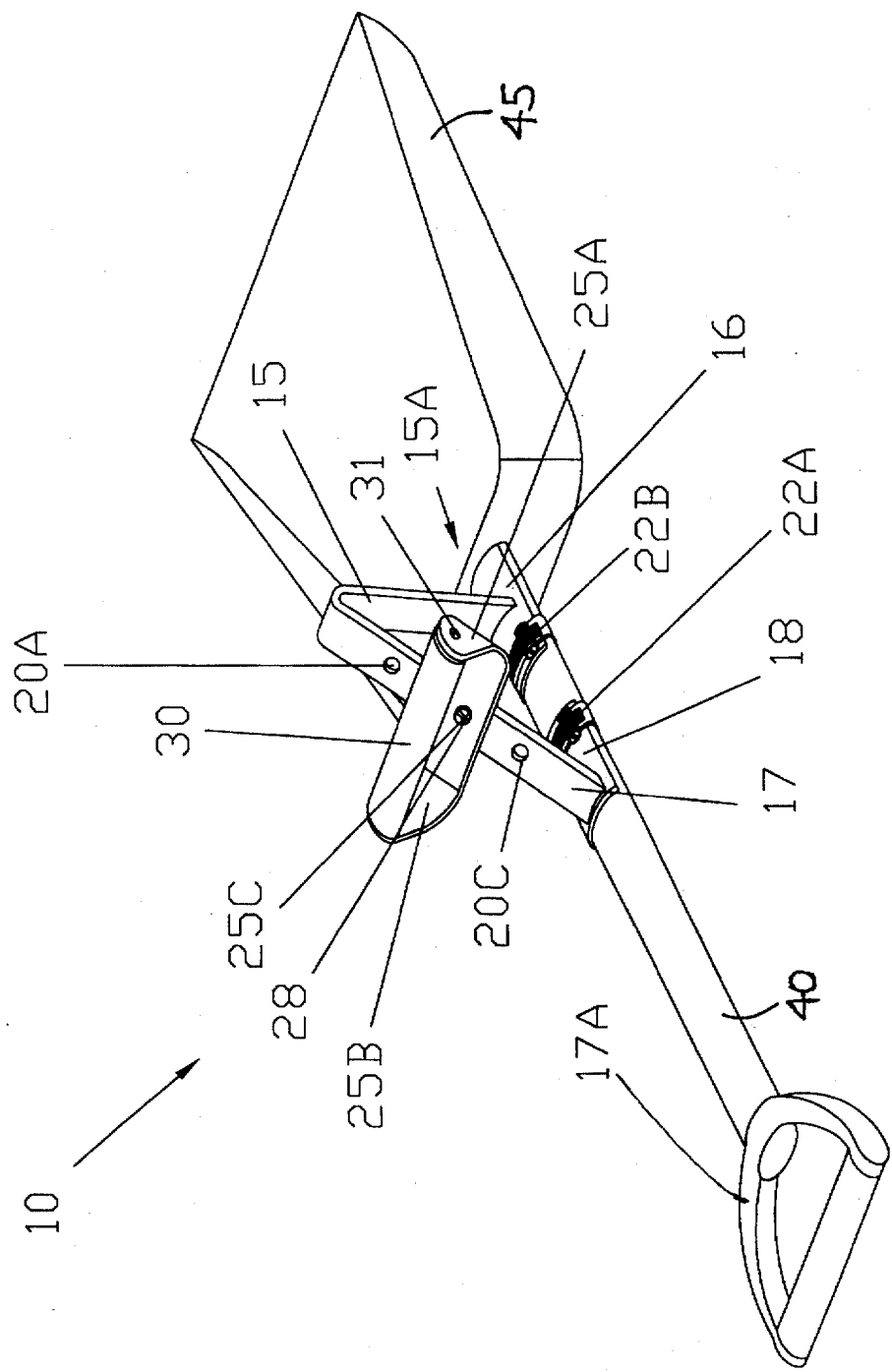
FIG. 2 is a perspective view of the detachable and adjustable auxiliary handle for a long-handled material-moving tool fastened to the handle shaft of a shovel.

Referring to the drawings in FIGS. 1 & 2, in particular, the detachable and adjustable auxiliary handle 10 for a long-handled material-moving tool comprises a handle bracket 15A preferably made of metal and having a first leg portion 15 of at least four inches in length and having an end which is fixedly attached to the top of a generally thin first foot portion 16 which is curved downwardly relative to the first leg portion 15 and has a bottom which is adapted and dimensioned to fittingly receive a portion of the handle shaft 40 of the shovel 45 to facilitate the securing of the auxiliary handle 10 to the handle shaft 40, the first leg portion 15 extending generally perpendicular to the handle shaft 40 and the first foot portion 16 being securely mounted about and generally flush against a portion of the handle shaft 40 with a conventional adjustable fastening ring 22B which has a plurality of slots spaced along the length thereof and has a screw which tightens the ends of the fastening ring 22B together about the handle shaft 40 of the material-moving tool.

As further illustrated in FIGS. 1 & 2, the handle bracket 15A also includes a second leg portion 17 which is integral to and forms an angled joint with the first leg portion 15 and which extends at an acute angle of approximately from 30 degrees to 60 degrees relative to the first leg portion 15 and which has an end which is fixedly attached to the top of a generally thin second foot portion 18 which is curved generally downwardly relative to the second leg portion 17 and which has a bottom which is adapted and dimensioned to fittingly receive and mount about and generally flush against a portion of the handle shaft 40 of the tool to facilitate, in cooperation with the first foot portion 16, the securing of the auxiliary handle 10 to the handle shaft 40. As with the first foot portion 16, the second foot portion 18 is secured to the handle shaft 40 with a conventional adjustable fastening ring 22A which has a plurality of slots spaced along the length thereof and has a screw which tightens the ends of the fastening ring together about the handle shaft 40 of the shovel 45.

The auxiliary handle 10 also has a generally U-shaped hand-hold support member 28 with the closed end 25C thereof having a hole therethrough and through which a fastening member such as bolt extends to fasten the hand-hold support member 28 to the second leg portion 17 of the handle bracket 15A, and with the extension portions 25A–B extending outwardly away from the second leg portion 17 which has three holes 20A–C aligned and spaced along the length thereof and through any of which the fastening member is extended to fasten the hand-hold support member 28 to the second leg portion 17. The hand-hold support member 28 supports a hand-hold member 30 which is preferably a cylinder made of wood but which could be made of other materials and which has a bore 31 therethrough. The hand-hold member 30 is disposed between the two extension portions 25A–B of the hand-hold support member 28 near the ends thereof and is fastened to the extension portions 25A–B with a fastener member such as a bolt which extends through the holes near the ends of the extension portions 25A–B and extends through the bore 31 of the hand-hold member 30. The hand-hold support member 28 is adjustably fastened along the length of the second leg portion 17 such that the hand-hold support member 28 can be moved up or down the second leg portion 17 to a selective location desired by the user and can be fastened where there is a hole 20A–C in the second leg portion 17 and can also be adjustably pivoted upon the second leg portion 17 and relative to the handle shaft 40 such that the hand-hold member 30 can be either slightly turned to the left relative to the handle shaft 40 as viewed from the rear of the shovel to accommodate right-handed users or slightly turned to the right relative to the handle shaft 40 as viewed from the rear of the shovel to accommodate left-handed users.

To use the auxiliary handle 10, the user positions the auxiliary handle 10 upon the top of the handle shaft 40 anywhere along the length thereof but preferably near the front end so that the user can generate leverage to lift the front end of the tool, with the bottoms of the first and second foot portions 16,18 being mounted about a top portion of the handle shaft 40 and the first leg portion 15 extending generally perpendicular to the handle shaft 40; then fastens the auxiliary handle 10 to the handle shaft 40 with the fastening rings 22A–B which overlay and engage the tops of the first and second foot portions 16,18 and further engage about the handle shaft 40 and are securely tightened with tightening members such as screws; next positions the hand-hold support member 28 to the desired location along the length of the second leg portion 17 and angles the hand-hold member 30 relative to the handle shaft 40 depending upon whether the person is right-handed or left-handed and fastens the hand-hold support member 28 with the fastening member to the desired location on the second leg portion 17, the fastening member being inserted through the hole in the hand-hold support member 28 and the hole at the desired location along the length of the second leg portion 17; and next grasps the primary handle 17A of the shovel with one hand, the primary handle 17A being normally positioned at the end and rear of the handle shaft 40 opposite to the moving or lifting portion 45 of the tool, and then takes the other hand and grasps the hand-hold member 30 to operate the shovel without having to stoop as much as the user had to without having the auxiliary handle 10, thus substantially reducing the possibility of the user having back problems, because when the user reaches and grasps the handle shaft 40 near the front end thereof, the user has to reach nearer the ground when the tool is being used upon the ground; whereas with the auxiliary handle 10 which extends upward and is vertically higher relative to the ground than is the front end of the handle shaft 40, the user doesn't have to reach nearer the ground and won't have to stoop much.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A detachable and adjustable auxiliary handle for a long-handled, material-moving tool comprising:

a handle bracket having a first leg portion, a first foot portion fixedly attached to an end of said first leg portion, a second leg portion integral to said first leg portion, and a second foot portion fixedly attached to an end of said second leg portion, said handle bracket being fastenable to a long-handled, material-moving tool, said first leg portion extending outwardly from a handle shaft of a long-handled, material-moving tool upon said handle bracket being fastened to the long-handled, material moving tool, said second leg portion being at an angle relative to said first leg portion;

a hand-hold support member securely fastenable to said handle bracket and being selectively fastenable along the length of said second leg portion and extending outwardly therefrom; and a hand-hold member which is attached to said hand-hold support member, further said second leg portion having a plurality of holes through which a fastening member securely fastens said hand-hold support member at selected locations along the length of said second leg portion for selectively positioning said hand-hold member as needed by users.

2. A detachable and adjustable auxiliary handle as described in claim 1, wherein said plurality of holes are spaced along the length of said second leg portion.

3. A detachable and adjustable auxiliary handle as described in claim 1, wherein said hand-hold support member is adjustably pivotable upon said second leg portion so that said hand-hold member can be turned relative to said handle shaft to facilitate use of said auxiliary handle by both right-handed and left-handed users.

* * * * *